Jan. 30, 1923.

P. M. SWAIM.
MATHEMATICAL CALCULATOR AND RULE.
FILED JAN. 14, 1922.

Patrick M. Swaim, INVENTOR.

BY Geo. P. Kimmel, ATTORNEY.

Jan. 30, 1923.  1,443,855
P. M. SWAIM.
MATHEMATICAL CALCULATOR AND RULE.
FILED JAN. 14, 1922.
2 SHEETS-SHEET 2
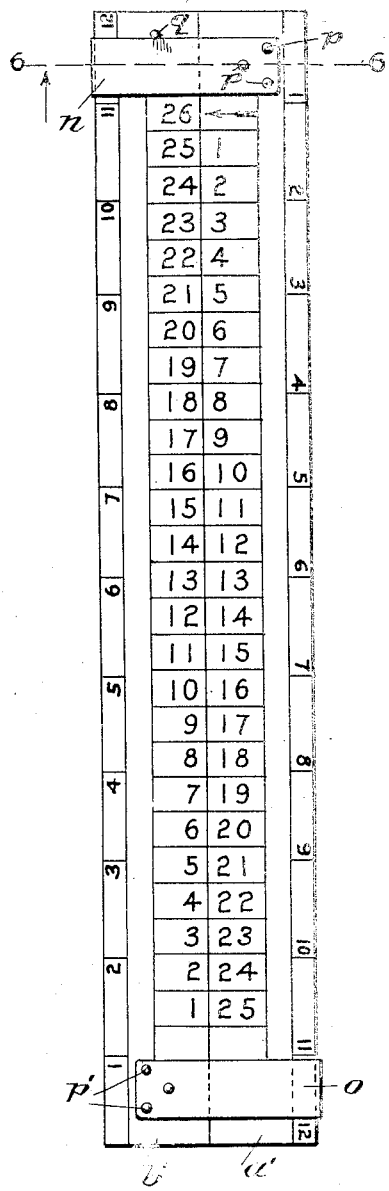
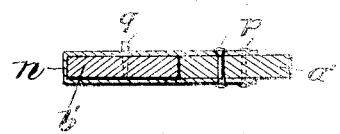
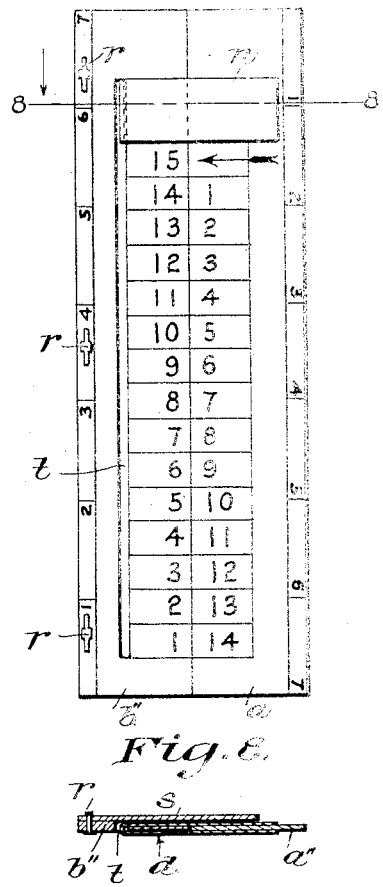
Patrick M. Swaim, INVENTOR.
Geo. P. Kimmel, ATTORNEY.

Patented Jan. 30, 1923.

1,443,855

UNITED STATES PATENT OFFICE.

PATRICK MARVIN SWAIM, OF LONOKE, ARKANSAS.

MATHEMATICAL CALCULATOR AND RULE.

Application filed January 14, 1922. Serial No. 529,201.

*To all whom it may concern:*

Be it known that I, PATRICK MARVIN SWAIM, a citizen of the United States, residing at Lonoke, in the county of Lonoke and State of Arkansas, have invented certain new and useful Improvements in Mathematical Calculators and Rules, of which the following is a specification.

This invention appertains to improvements in mathematical calculators generally, and has for its principal object to provide for an extremely simple and inexpensive construction and arrangement of parts having the form of a slide rule capable of use in solving simple problems of addition and subtraction, such as will be valuable for the teaching of children or other persons of little or no education.

With the foregoing and other objects in view, the invention resides in the certain new useful construction and arrangement as will be hereinafter more fully described, set forth in the appended claim, and illustrated in the accompanying drawings, in which:—

Figure 1 is a plan view of a preferred embodiment of the calculator and rule.

Figure 4:

Fig. 4 is a transverse sectional view showing the manner of interlocking the two portions, bars or strips of the instrument for sliding movement one relative to the other, Fig. 5 is a plan view of a modified form of the instrument, Fig. 6 is a transverse section taken on the line 6—6 of Fig. 5, Fig. 7 is a plan view of another modified form of the device, and, Fig. 8 is a transverse section taken on the line 8—8 of Fig. 7.

Referring to the drawing, the embodiment of the instrument as shown therein comprises a pair of parallel strips or bars of sheet metal or the like $a$ and $b$, having their adjacent longitudinal side edges one interlocked with the other for relative sliding movement. The upper faces of the bars or strips $a$ and $b$ are each ruled longitudinally to provide inner spaces $c$ and $c'$; intermediate spaces $d$ and $d'$; and outer spaces $e$ and $e'$, respectively, and each of the inner spaces $c$ and $c'$, extend parallel to the line of division between the bars or strips $a$ and $b$, and are each provided with a column of digits or numerals, reading in the present instance one to thirty-one, inclusive, the column in the space $d'$, of the bar or strip $d$, being arranged in the reversed order of the arrangement of the digits or numerals of the column in the space $c$ of the bar or strip $a$, or, in other words, the column of digits or numerals in the space $c$, of the bar or strip $a$, read downwardly of the space from one to thirty-one, and in the space $c'$ of the bar or strip $b$, the column of digits or numerals read from thirty-one to one in the downward direction thereof, the digits or numerals of one column being directly opposite those of the other column, when the two bars or strips $a$ and $b$ are normally disposed with their opposite ends one flush in the plane of the other. The intermediate spaces $d$ and $d'$ are shown in blank, in the drawing, but may be utilized for advertising matter or the like, if desired, while the outer spaces $e$ and $e'$ are each preferably divided by a series of transversely extending lines $f$ and $f'$, respectively, to provide inch scale measures, the scale on the outer edge of the bar or strip $a$ reading from one to twelve inches, inclusive, in a downward direction, and the scale on the outer edge of the bar or strip $b$ reading in a reverse direction from one to twelve inches upwardly thereof. Extending transversely of the upper end of the bar or strip $a$ immediately above the column of digits or numerals in the space $c$ thereof, is an arrow $g$ having its indicating end or point directed toward the inner longitudinal edges of the bars or strips $a$ and $b$, and in the manipulation of the instrument, the digits or numerals in the space $c'$ of the bar or strip $b$ are adapted to register with the pointed end of the arrow $g$, whereby the answer to all problems of addition may be indicated thereby, as will be hereinafter more fully explained.

In the preferred embodiment of the instrument as shown in the drawing, the two parallel bars or strips $a$ and $b$ are constructed of sheet metal, and the bar $a$ is bent on its longitudinal center, as at $h$, to provide an inner portion $i$, offset below the plane of the outer portion, and the inner edge of this lower offset portion is bent downward and backwardly upon itself to provide an underlying edge or tongue portion $j$, arranged in interlocked sliding engagement with a closed channelway $k$ formed by the bending of the adjacent longitudinal edge of the strip $b$. The bar or strip $b$ is first bent on its longitudinal center to provide an underlying portion $l$ disposed in sliding contact with the upper face of the lower offset portion of the strip $a$, and whereby the upper scaled faces of the two strips $a$ and $b$ are disposed one flush in the plane of the other, and the inner longitudinal folded edge of the strip $b$ extends parallel to and in close relation to the bend $h$ in the strip $a$. The channelway $k$ of the strip $b$, is formed by the bending of the free edge portion of the underlying portion $l$ thereof downward and backward upon itself, and then again in an upward and forward direction to provide a tongue portion $m$ extending between the inner side of the first folded portion thereof and the opposed underside of the underlying portion $l$, when the bent edge or tongue portion $j$ of the strip $a$, will be engaged beneath the tongue portion $m$ of the strip $b$, and interlocked therewith, but in a manner that the two bars or strips $a$ and $b$ are slidable in the longitudinal direction one relative to the other. The outer longitudinal edges of the bars or strips $a$ and $b$ are each bent downwardly and backwardly upon the under sides thereof, in a manner to provide flat folds $n$ and $n'$, respectively, and substantially of bead-like form as shown, whereby to lend rigidity to these ruling edges of the same, as well as to the instrument as a whole.

Figure 1:
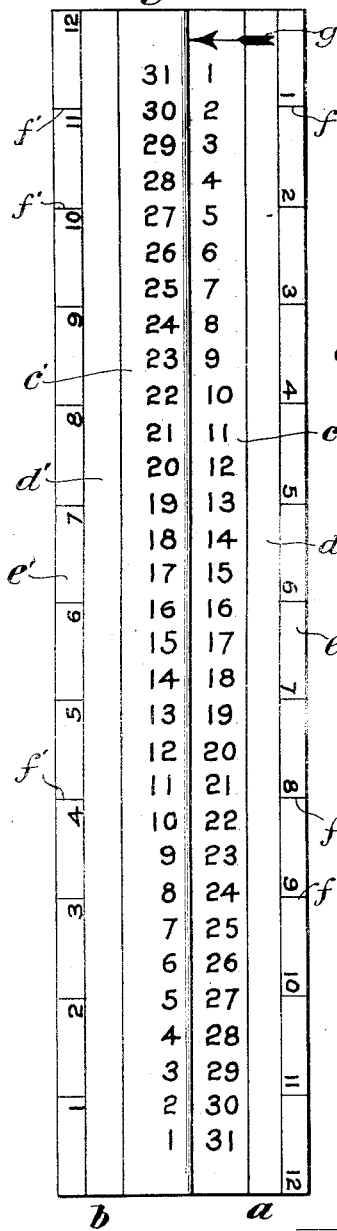
Figure 2:
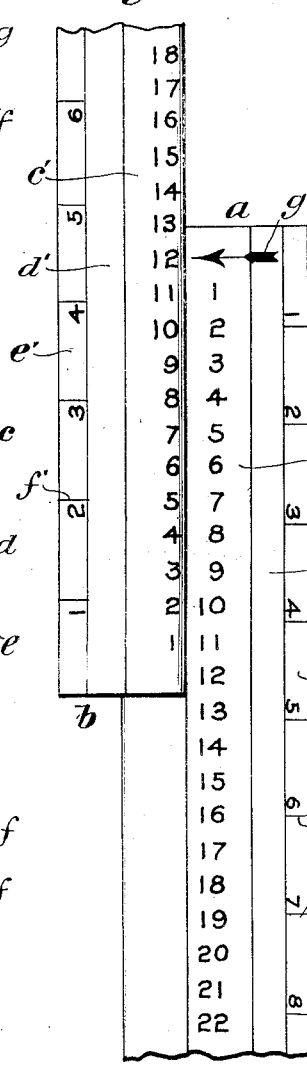
Fig. 2 is a fragmentary plan view of the same in one of its positions of operation.
Figure 3:
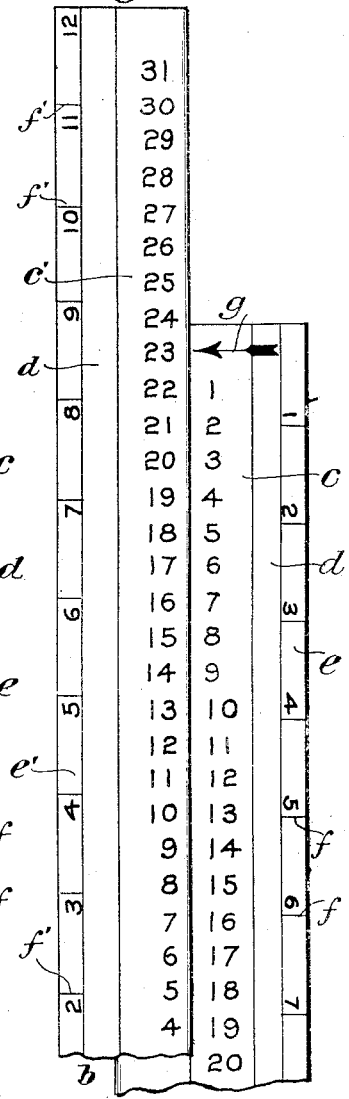
Fig. 3 is a similar view thereof in another position of operation.

In the use of the instrument as a rapid calculator, or for the adding together of two numbers, as for instance two and ten, the bar or strip $a$ will be grasped in one hand and the bar or strip $b$ in the other, and by sliding one relative to the other, the number two on the bar or strip $b$ will be brought into registry or alinement with the numeral 10 on the bar or strip $a$, when the answer twelve will be read on the bar or strip $b$ at a point opposite the point of the arrow $g$ on the bar or strip $a$, substantially as is shown in Fig. 2. It will also be noted that the sum total of all of the alined sets of numerals of the two bars or strips $a$ and $b$ will equal the stated total twelve as indicated by the arrow $g$, and this is true regardless of the position of the bar $b$ with respect to the bar $a$ except when the two bars or strips $a$ and $b$ are in their ordinary positions, or inoperative, as is shown in Fig. 1, and when the bar $b$ is moved in the forward or upward direction to bring any one of its digits or numerals in line with the pointed end of the arrow $g$. Similarly when it is desired to subtract one number from another, as for instance in subtracting sixteen from twenty-three, as shown in Fig. 3, the bar or strip $b$ is slid along the bar or strip $a$ until the larger number or twenty-three is alined with the arrow $g$, then, by glancing down the column $c'$, of the bar or strip $b$, and finding the numeral sixteen, the answer seven will be read in the column $c$ on the bar or strip $a$. In the use of the instrument as an ordinary measure or rule, the arrangement of the inch scales at the opposite longitudinal edges thereof, is such that, regardless of the edge used, the scale figures will always read from left to right.

From the foregoing, it will be readily apparent that the invention provides for an extremely simple form of calculator and rule capable of being easily and rapidly manipulated by children, or persons of little or no education, for the solving of simple problems in mathematics, such as involve addition and subtraction; and the same can be cheaply made from such materials as wood, pasteboard, celluloid, or from known compositions of substances, as well as from sheet metal, and that the parallel bars or strips $a$ and $b$ may be made of any length other than as shown, in which case, the number of digits or numerals of the columns $c$ and $c'$, together with the inch scales thereon, will be correspondingly increased or decreased.

In Figures 5 and 6 I have shown an extremely simple and comparatively inexpensive modification of the invention, and in this instance, the parallel bars or strips $a'$, $b'$, are made of wood or the like, and are disposed in side edge to edge relation, and each have their upper faces ruled and otherwise laid off in the manner of the bars or strips $a$, $b$, as shown in Figures 1 to 4. The bars $a'$, $b'$, are coupled together for sliding movements one relative to the other by means of metal loops $n$, $o$, the loop $n$ engaging over the upper end of the bar $b'$ and having its opposite ends secured at the opposite sides of the bar $a'$, by means of rivets or the like $c$, while the loop $o$ is engaged over the lower end of the bar $a'$ and has its opposite ends secured at the opposite sides of the bar $b'$ by means of rivets $p'$, substantially as is shown. The loops $n$, $o$, are arranged immediately inward of the opposite ends of the bars $a'$, $b'$, and to prevent the complete separation of the bars in their sliding movements in one direction a stop pin $q$ is positioned at the upper end of the bar $b'$, so as to be abutted by the opposed end of the loop $n$, when the two bars or strips are disposed with their opposite ends flush with one another, while such separation thereof is prevented, in the other direction, by reason of the upper loop $n$ abutting the lower loop $o$.

In Figures 7 and 8, a further modification of the invention is shown, and in this instance, the two bars or strips $a''$, $b''$, are preferably formed of cardboard or the like, the bar or strip $b''$ being secured at its outer longitudinal edge, by means of suitable fasteners, such as staples, or the like $r$, to the outer longitudinal face edge of the face strip s, which is of a greater width than the bar or strip b'', so as to underlie and support the bar or strip a'' thereon, and to one side of the bar or strip b''. The bar or strip b'' is formed to provide a slot way t extending a major length thereof from points equidistantly spaced inwardly from the opposite ends of the same and disposed in parallel relation with respect to its longitudinal edges, substantially as is shown, a loop u is arranged in the slot way t, and has its opposite ends secured, as by gluing, to the opposite sides of the bar or strip a'', and at a point thereof whereby the loop abuts the upper end of the slot t, when the opposite ends of the bars or strips a'', b'', are aligned one with the other. The upper faces of the bars or strips a'', b'', are ruled and otherwise laid off as in the manner of the first two forms of the device or instrument as hereinbefore explained.

It is also to be well understood that, while a preferred embodiment of the instrument has been described and illustrated herein in specific terms and details of construction, arrangement and operation, various changes in and modifications of the same may be resorted to without departing from the spirit of the invention, or the scope of the claim appended hereto.

Having thus fully described the invention, what is claimed, is:—

A calculator for teaching addition and subtraction, comprising a pair of opposed elongated rectangular bars having the inner sides thereof arranged in abutting relation with respect to each other, overlapping means for slidably connecting said bars together to permit of the shifting thereof longitudinally one relative to the other, each of said bars having its outer face provided with a column of consecutively arranged numerals the numerals of one column being the same as and opposing the numerals of the other column and with the numerals of one column arranged in reversed order with respect to the numerals of the other column, and with the column of numerals of one bar cooperating with the column of numerals on the other bar whereby when one bar is longitudinally shifted, relative to the other bar, the solving of a problem in addition or subtraction will be obtained.

In testimony whereof, I affix my signature hereto.

PATRICK MARVIN SWAIM.